(12) United States Patent
Milanovic et al.

(10) Patent No.: US 7,729,876 B2
(45) Date of Patent: Jun. 1, 2010

(54) DIAGNOSTIC DEVICE FOR USE IN PROCESS CONTROL SYSTEM

(75) Inventors: Raiko Milanovic, Frankfurt (DE); Wolfgang Scholz, Minden (DE); Andrea Andenna, Baden (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/004,018

(22) Filed: Dec. 20, 2007

(65) Prior Publication Data

US 2008/0103629 A1 May 1, 2008

Related U.S. Application Data

(63) Continuation of application No. PCT/CH2005/000345, filed on Jun. 21, 2005.

(51) Int. Cl.
- G01C 25/00 (2006.01)
- G06F 11/30 (2006.01)
- G21C 17/00 (2006.01)

(52) U.S. Cl. ............. 702/116; 702/182; 702/185

(58) Field of Classification Search ............. 702/116, 702/182–185, 77, 91, 104, 138, 179, 180; 324/76.11, 500, 512

See application file for complete search history.

(56) References Cited

U.S. PATENT DOCUMENTS

| | | | |
|---|---|---|---|
| 5,680,109 | A | 10/1997 | Lowe et al. |
| 7,177,756 | B2 | 2/2007 | Moninger |
| 7,212,953 | B1 * | 5/2007 | Artiuch ............. 702/183 |
| 2002/0029130 | A1 | 3/2002 | Eryurek et al. |
| 2002/0144674 | A1 * | 10/2002 | Wang et al. ............. 123/568.21 |
| 2004/0111193 | A1 | 6/2004 | D'Ouince et al. |
| 2006/0287806 | A1 * | 12/2006 | Hori ............. 701/114 |
| 2008/0033693 | A1 * | 2/2008 | Andenna et al. ............. 702/179 |

FOREIGN PATENT DOCUMENTS

| | | |
|---|---|---|
| WO | WO 2004/033882 | 4/2004 |
| WO | 2006-136036 | * 12/2006 |

OTHER PUBLICATIONS

Notification Concerning Transmittal of International Preliminary Report on Patentability (Form PCT/IB/326), International Preliminary Report on Patentability (Form PCT/IB/373) and Written Opinion of the International Searching Authority (Form PCT/ISA/237), issued by the European Patent Office in corresponding International Patent Application No. PCT/CH2005/000345, Jan. 10, 2008, Rijswijk, NL.
PCT/ISA/210, PCT/ISA/220 and PCT/ISA/237, Jun. 3, 2006.
Translation of Chinese Office Action Filed Nov. 17, 2009.

* cited by examiner

*Primary Examiner*—Michael P Nghiem
(74) *Attorney, Agent, or Firm*—Buchanan Ingersoll & Rooney PC

(57) ABSTRACT

The diagnostic device that detects a failure of a sensor. The sensor includes memory for repeatedly recording pairs of two absolute pressure values, the absolute pressure values being related to absolute pressures in the first and the second impulse lines, respectively. A processor repeatedly computes, from a prescribable number of pairs of the two absolute pressure values, a correlation value representative of the correlation between the two absolute pressure values. The processor can also compare correlation values to at least one correlation threshold value, and generate a diagnostic output depending on the result of the comparison. It is possible to derive the absolute pressure values from one differential pressure measurement and one absolute pressure measurement.

14 Claims, 3 Drawing Sheets

DIAGNOSTIC DEVICE FOR USE IN PROCESS CONTROL SYSTEM

RELATED APPLICATION

This application claims priority as a continuation application under 35 U.S.C. § 120 to PCT/CH2005/000345 filed as an International Application on 21 Jun. 2005 designating the U.S., the entire contents of which are hereby incorporated by reference in their entireties.

TECHNICAL FIELD

The disclosure relates to the field of diagnostics of process devices, such as they are used in industrial or scientific processes, and in particular to the field of process device diagnostics using a sensed process variable of the process.

BACKGROUND INFORMATION

Such a diagnostic device and diagnostic method is known from the patent publication U.S. Pat. No. 5,680,109. The device is connected to two impulse lines, which are coupled to a process fluid of a process, and either senses the two absolute pressures in the two impulse lines or one absolute pressure in one impulse line and one differential pressure between the two impulse lines. The device processes the pressure signals so as to extract from them vibration noise signals carried in the process medium (e.g., liquid, gas). Such vibration-related processed signals are then evaluated, with the evaluation ending in an output indicating that the impulse lines are not blocked or that at least one of the impulse lines are blocked.

SUMMARY

One goal of the disclosure is to create an alternative method for determining a blockage or other failure of at least one impulse line, and more general, to provide for a method for detecting a failure of a sensing means, which sensing means comprises at least one impulse line. In addition, a corresponding diagnostic device for detecting a failure of such a sensing means or impulse line shall be provided. Typically the impulse lines are to be connected to a transmitter, in particular to a pressure transmitter.

A diagnostic device is disclosed for detecting a failure of a sensing means, which sensing means comprises at least one of first and a second impulse lines. The diagnostic device comprises a recording means for repeatedly recording pairs of two absolute pressure values, the absolute pressure values being related to absolute pressures in the first and the second impulse lines, respectively; a computation means for repeatedly computing, from a prescribable number of pairs of the two absolute pressure values, a correlation value representative of the correlation between the two absolute pressure values; a comparison means for comparing correlation values to at least one correlation threshold value; and an output means for outputting a diagnostic output depending on the result of the comparison. The correlation values are compared to a lower correlation threshold value and to an upper correlation threshold value.

A diagnostic method is disclosed for detecting a failure of a sensing means, which sensing means comprises at least one of first and a second impulse lines. The method comprises the steps of: recording pairs of two absolute pressure values, the absolute pressure values being related to the absolute pressures in the first and a second impulse lines; computing, from a prescribable number of pairs of the two absolute pressure values, a correlation value representative of the correlation between the two absolute pressure values; comparing correlation values to a lower correlation threshold value and to an upper correlation threshold value; and outputting a diagnostic output depending on the result of the comparison.

BRIEF DESCRIPTION OF THE DRAWINGS

Below, the disclosure is illustrated in more detail by means of exemplary embodiments, which are shown in the included drawings. The figures show.

The reference symbols used in the figures and their meaning are summarized in the list of reference symbols. Generally, alike or alike-functioning parts are given the same reference symbols. The described embodiments are meant as examples and shall not confine the disclosure.

DETAILED DESCRIPTION

Figure 1:
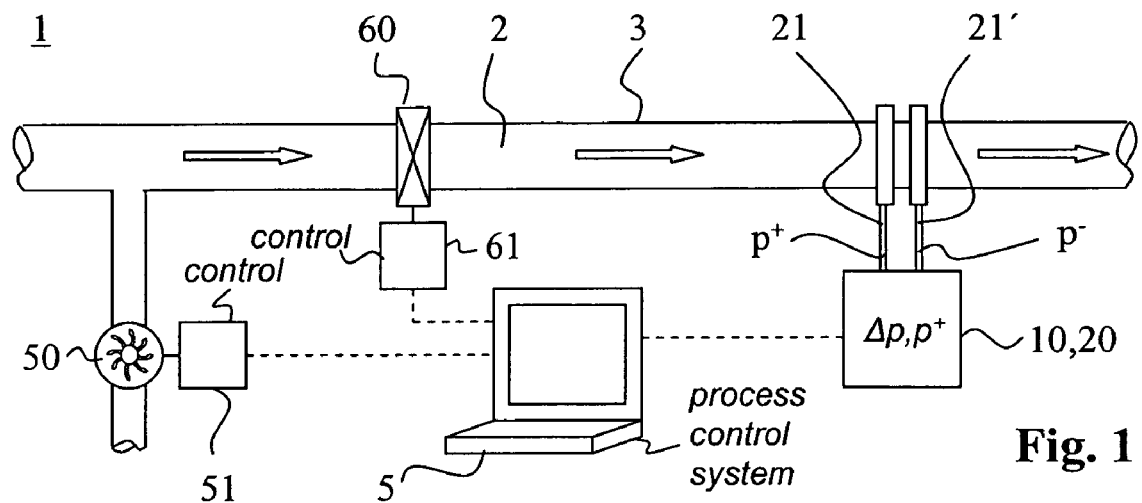
FIG. 1 a schematic illustration of a process control environment including a diagnostic device.

According to the disclosure, the diagnostic device for detecting a failure of a sensing means, which sensing means comprises at least one of first and a second impulse lines, wherein the diagnostic device comprises a recording means for repeatedly recording pairs of two absolute pressure values, the absolute pressure values being related to absolute pressures in the first and the second impulse lines, respectively, a computation means for repeatedly computing, from a prescribable number of pairs of the two absolute pressure values, a correlation value representative of the correlation between the two absolute pressure values, a comparison means for comparing correlation values to at least one correlation threshold value, and an output means for outputting a diagnostic output depending on the result of the comparison.

The corresponding method is a diagnostic method for detecting a failure of a sensing means, which sensing means comprises at least one of first and a second impulse lines, and the method comprises the steps of:

recording pairs of two absolute pressure values, the absolute pressure values being related to the absolute pressures in the first and a second impulse lines, computing, from a prescribable number of pairs of the two absolute pressure values, a correlation value representative of the correlation between the two absolute pressure values, comparing correlation values to at least one correlation threshold value, and outputting a diagnostic output depending on the result of the comparison.

Through this, it is possible to provide for reliable grounds for the diagnostic output of the diagnostic device, i.e., for the output indicating that there is a failure (blockage) in at least one of the two impulse lines or, more general, for the output indicating that there is a failure in the sensing means.

The diagnostic device can be any device or combination of devices, which is capable of recording pressure values and processing them in the depicted way. It can be a transmitter (in particular a pressure or a flow velocity transmitter), a process monitoring device or process monitoring system, a controller or a process control system, a personal computer or a microprocessor or the like. The diagnostic device can be suitable for use in a process control environment. It can be implemented in a control system. The diagnostic device can be integrated in a transmitter, in a process monitoring device, in a controller or the like. The diagnostic device can, e.g., be realized in a flowmeter, a pressure transmitter (for absolute pressures) or differential pressure transmitter.

The diagnostic output is related to a condition of the process, wherein the condition of the process is different from a measure for one or both of the absolute pressure values and also different from another process variable, which the sensing means would provide, like a differential pressure, a flow velocity or the like. The diagnostic output is related to the condition of a sensing means, in particular to the condition of an impulse line, which can be a part of a sensing means.

The sensing means is designed for sensing a process variable of a process medium of a process, like an absolute pressure, a differential pressure, a flow velocity or the like of a liquid in a tubing system.

In an exemplary embodiment the at least one correlation threshold value is derived from a statistical analysis of a number of correlation values obtained (recorded) during a training phase. In this exemplary embodiment, it is provided for a training phase (a prescribable time span), during which, under normal operating conditions, correlation values are recorded. These correlation values are then statistically analyzed, e.g., by calculating the (arithmetic) mean of the recorded correlation values and possibly also the variance of the correlation values. The at least one correlation threshold value can then be calculated on the basis of the statistical analysis. E.g., if the range of all possible correlation values is between 0 and 1, one correlation threshold value may be chosen as 0.5 times the mean correlation value as obtained during the training phase, or as the mean correlation value minus one time the variance, as obtained during the training phase (unless this would be smaller than 0).

An aspect of this exemplary embodiment is, that the at least one correlation threshold value can be obtained automatically, and that the at least one correlation threshold value is chosen in direct dependence of the real process conditions.

It is possible to choose correlation threshold values independent from the actual process conditions. A correlation threshold value may also be chosen, e.g., just in dependence of the viscosity of the process medium of the process.

Preferably, the statistical analysis of the number of correlation values obtained during a training phase comprises fitting a statistical distribution function to the correlation values recorded during the training phase.

In this way, a rather short training phase is sufficient for obtaining correlation threshold values that fit the process conditions very well.

Advantageously, the correlation values are compared to a lower correlation threshold value and to an upper correlation threshold value. This is advantageous, because both, an exceedingly low and an exceedingly high correlation between the absolute pressure values, can indicate a failure of at least one of the impulse lines.

In another exemplary embodiment, the computation means is designed for repeatedly computing, from a prescribable number of a first of the two absolute pressure values, a signal power value, and the comparison means is designed for comparing signal power values to at least one signal power threshold value, wherein signal power values are derived from a transform of the prescribable number of first pressure values into coefficients of a set of orthogonal functions.

In such an exemplary embodiment, and if the first absolute pressure is measured at a first of the two impulse lines, it is possible, to detect, whether the first impulse line or the other impulse line is blocked, when it has been detected that exactly one of the two lines are blocked.

The transform can be one of the group of Fourier transform and wavelet transform.

Advantageously, the at least one signal power threshold value is obtained from a number of signal power values obtained during a training phase. An aspect of this exemplary embodiment is, that the at least one signal power threshold value can be obtained automatically, and that the at least one signal power threshold value is chosen in direct dependence of the real process conditions. Some statistical analysis, e.g. fitting of a distribution function, can be performed on the signal power values obtained during the training.

In an exemplary embodiment, the diagnostic device comprises at least one sensing means
   for measurement of an absolute pressure, and
   for measurement of a differential pressure between the two impulse lines, and the two absolute pressure values are derived from measurements performed with the at least one sensing means. I.e., in that embodiment, the diagnostic device is capable to sense the pressure difference (differential pressure) between the pressure in the first and the pressure in the second impulse line, and, in addition, it is capable to sense an absolute pressure. That absolute pressure can, be the absolute pressure in one of the two impulse lines. In that case, the two absolute pressure values are readily at hand.

A transmitter, in particular a pressure or flow velocity transmitter, according to the disclosure comprises a diagnostic device according to the disclosure and/or implements a diagnostic method according to the disclosure.

An exemplary process control system according to the disclosure comprises a diagnostic device according to the disclosure and/or implements a diagnostic method according to the disclosure.

An exemplary process monitoring device according to the disclosure comprises a diagnostic device according to the disclosure and/or implements a diagnostic method according to the disclosure.

An exemplary process control environment according to the disclosure comprises a diagnostic device according to the disclosure and/or implements a diagnostic method according to the disclosure.

FIG. 1 schematically illustrates a typical process control environment 1 with a diagnostic device 10. The diagnostic device 10 is comprised in a pressure transmitter 20, which is connected to two impulse lines 21,21', through which it is coupled to a process medium 2 of the process control environment 1. The process medium 2 typically is a flowing fluid, symbolized in FIG. 1 by open arrows. The pressure transmitter 20 is designed to transmit an absolute pressure $p^+$ and, in addition, a differential pressure dp. The absolute pressure $p^+$ is the pressure in the first impulse line 21, which is upstream from the second impulse line 21', in which there is an absolute pressure $p^-$. The differential pressure dp is the absolute of the difference between $p^+$ and $p^-$, accordingly: $dp=p^+-p^-$.

The pressure transmitter 20 can also be understood as a process monitoring device 20, which monitors a differential pressure and an absolute pressure in the process medium 2.

The process medium 2 can be, e.g., a liquid like water or oil, which is contained in a tube 3. Process control devices like a pump 50 (including a pump control 51) and a valve 60 (including a valve control 61) are provided in the process control environment 1. The process control devices 10,20,50,60 are connected to a typically computer-based process control system 5. The process control system 5 can also be understood as a process control device 5, which (through the connection with the diagnostic device 10) incorporates (comprises) the diagnostic device 10.

The pressure transmitter 20 as shown in FIG. 1 can be understood as an example of a diagnostic device 10 with a sensing means.

Figure 2:
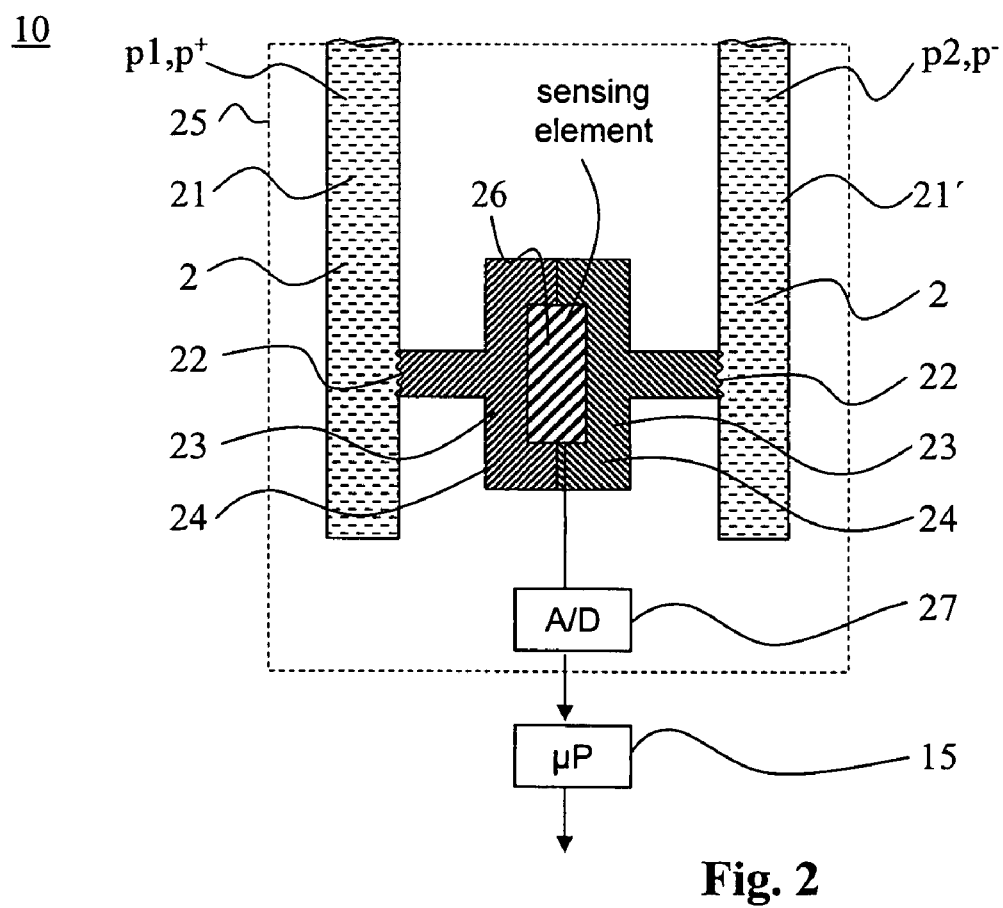
FIG. 2 schematically a diagnostic device with a sensing means, embodying a differential pressure transmitter.

FIG. 2 schematically shows a part of such a pressure transmitter 20. The sensing means 25 comprises the two impulse lines 21,21', which are filled with process medium 2. The sensing means 25 comprises a sensing system (sensing element) 26. One process membrane 22 and one pressure transmission arm 23 are provided for each of the impulse lines 21,21'. The pressure transmission arms 23 (oil circuits 23) are filled with oil 24 as a sensing medium 24. The process membranes 22 are an interface between the impulse lines 21,21' (containing process medium 2) and the oil circuits 23 (containing sensing medium 24). Through the pressure transmission arm 23 the absolute pressures p1 (corresponding to $p^+$) and p2 (corresponding to $p^-$) of the process medium (in the impulse lines 21,21') are transferred to the sensing system 26. This allows to sense the differential pressure $dp=p^+-p^-$.

Among others, the sensing system 26 may be based on one or more of the following principles, which allow to derive an electrically measureable signal from the differential pressure dp:

Induction (the differential pressure modulates the inductance of a magnetic circuit)

Piezoresistivity (the differential pressure modulates an output voltage of a piezoresistive element)

Capacitance (the differential pressure modulates the capacity of an electric circuit).

The signal derived that way is then digitized in a analogue-to-digital converter 27. It is related to the differential pressure dp between the two impulse lines 21,21'.

For creating a combined absolute pressure and differential pressure transmitter 20, as it is indicated in FIG. 1, it is, e.g., possible to add another sensing element and a pair of pressure transmission arms to the device 10 shown in FIG. 2 (or, more precisely, to the sensing means 25 shown in FIG. 2). One pressure membrane would be an interface between, e.g. the first of the two impulse lines 21,21' (containing process medium 2) and the oil circuit of that pressure transmission arm. The other pressure transmission arm would contain vacuum. Other ways of sensing the absolute pressure can be used, too. The signal obtained from the additional sensing element can then be digitized in another analogue-to-digital converter. It is related to the absolute pressure in that one of the impulse lines 21,21', which is interfaced by the additional membrane, e.g., the absolute pressure $p1=p^+$ would then be sensed.

A microprocessor 15 of the diagnostic device 10 can then record the two digitized signals (differential pressure signal and absolute pressure signal) and derive diagnostic information from them.

A diagnostic device 10 can be used to diagnose the condition and failures of the sensing means 25. In particular, the following failures may occur and can be detected by the diagnostic device 10:

1. At least one of the oil circuits 23 has a leak.
2. The interface between the two oil circuits 23 (usually an additional membrane) is damaged, so that the sensing medium 24 can flow between the two circuits 23.
3. At least one of the process membranes 22 is broken, so that the process medium 2 can flow into at least one of the pressure transmission arm.
4. At least one of the impulse lines 21,21' is partially or completely plugged.

Frequent reasons for a plugged impulse line (failure 4.) are:

Solid material is present in the process medium 2 and blocks the impulse line.

Some sedimentary process takes place in the impulse line and progressively plugs the impulse line (e.g., limestone).

The process medium in the impulse line solidifies, typically because of low temperatures. (This can happen even if the process medium 2 in the rest of the process does not solidify, because the process medium 2 in the impulse lines 21,21' is mainly still, whereas the process medium 2 in the process is usually flowing and therefore not still.)

It is of considerable value to have diagnostic information on the condition of the sensing means 25 and in particular of the impulse lines. It is particularly valuable, if the diagnostic information can distinguish between (some of) the above-mentioned failure modes.

It is advantageous for a diagnostic device, which uses at least two impulse lines (e.g., for a device using pressure and/or differential pressure signals derived from these at least two impulse lines), to have the impulse lines connected to the process at points, which are arranged close to each other. I.e., it is advantageous, when the locations at which the at least two impulse lines are coupled to the rest of the process medium, are in close proximity. The advantage is, that measured pressure values are small, fluctuations in the process fluid are mostly cancelled.

How to get from $p^+$ and dp to the diagnostic information? Firstly, from the sensed signals, two absolute pressure values must be extracted. When, as indicated in FIGS. 1 and 2, the first impulse line 21, at which the absolute pressure $p^+$ is sensed, is located upstream from the second impulse line, in which there is the pressure $p^-$, the absolute pressures p1,p2 are derived as $$p1=p^+, \text{ and} \qquad (3)$$

$$p2=p^+-dp. \qquad (4)$$

When, on the other hand, the absolute pressure is sensed at the impulse line 21', which is located downstream, the absolute pressures p1,p2 are derived as $$p1=p^-+dp, \text{ and} \qquad (3')$$

$$p2=p^-. \qquad (4')$$

It is also possible to sense an absolute pressure at a third impulse line, which can be located very close to at least one of the other two impulse lines 21,21'. In that case, the second absolute pressure value can be obtained by adding or subtracting the differential pressure value dp to that absolute is pressure, depending on the location of the third impulse line with respect to the other impulse lines 21,21'.

It is also possible to directly sense two absolute pressure values (which can render a differential pressure sensor superfluous).

Yet, it is preferred to sense one absolute and one differential pressure, and use only two impulse lines, because this allows for high precision at moderate effort (moderate required resolution of the analogue-to-digital converter).

Figure 3:
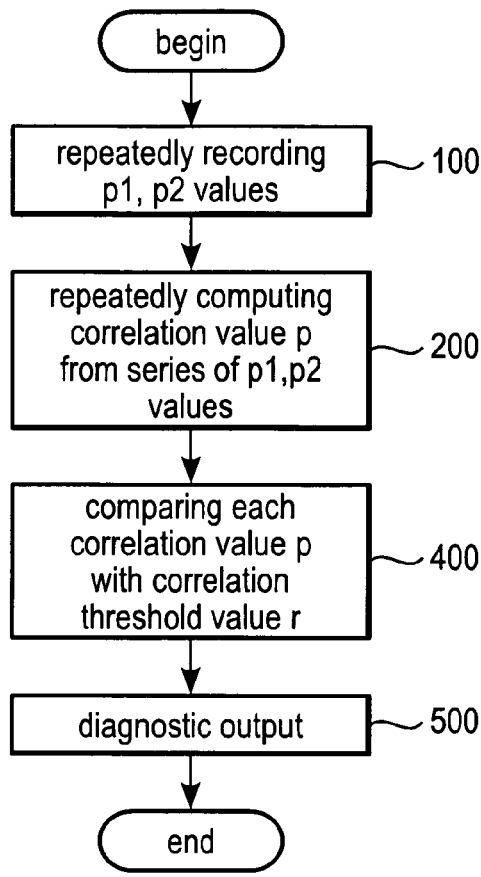
FIG. 3 a block diagram indicating steps performed in the diagnostic device during normal operation.

FIG. 3 schematically shows an block diagram indicating steps performed in the diagnostic device during normal operation. In a recording means 100, absolute pressure values p1,p2 are repeatedly recorded. In more or less constant time intervals (e.g., 10 ms), p1-values and p2-values can be recorded.

After some time, a (prescribable) number n of pairs of p1- and p2-values (e.g., n=20 pairs) are gathered, and a correlation value ρ can be computed from that series of values p1,p2 in a computation means 200. One possible way is to calculate the linear correlation coefficient ρ, which can be computed as follows:

$$\begin{cases} \rho(p_1, p_2) = \dfrac{\sum\limits_{k=0}^{n-1}[(p_1(k)-\mu(p_1))(p_2(k)-\mu(p_2))]}{\sqrt{\sum\limits_{k=0}^{n-1}[(p_1(k)-\mu(p_1))^2]}\sqrt{\sum\limits_{k=0}^{n-1}[(p_2(k)-\mu(p_2))^2]}} & (1) \\ \mu(p_i) = \dfrac{1}{n}\sum\limits_{k=0}^{n-1} p_i(k)\ i=1,2 & (2) \end{cases}$$

$\mu(p_i)$ is the (arithmetic) mean of the pressure value $p_i$, wherein i can be 1 or 2; n is the number of pairs in the series of absolute pressure values used for the calculation. It is possible to use other formulas for calculating that correlation value, and it is also possible to calculate a different correlation value, e.g., the coefficient of quadratic correlation or a function of such a value, like, e.g., its inverse or its absolute.

One advantage of the linear correlation coefficient is that its value cannot take arbitrary values, but only those between (and including) −1 and +1. For perfect positive correlation is ρ=1, for perfect negative correlation is ρ=−1, and for no correlation is ρ=0. If the diagnostic device is always in the same manner connected to impulse lines (with respect to the upstream/downstream location of the impulse lines), the values of the correlation values ρ can be confined to positive numbers. (Alternatively, it is also possible to proceed with the absolute value of ρ).

Each correlation value is then, in a comparison means 400, compared to at least one correlation threshold value r. That correlation threshold value r is prescribable. If, e.g., the values of p can only be in the interval 0 to 1, r could be chosen as a lower limit for the correlation. e.g., r=0.4. The comparison would then mean to ask "ρ<r?". In case the answer would be "yes", an output means 500 would indicate a failure of one of the impulse lines 21,21'.

Preferably, ρ is compared to two correlation threshold values r and R, with r being a lower limit and R being an upper limit. The comparison would then mean to ask "(ρ<r) or (ρ>R)?". In case the answer would be "yes", the output means 500 would indicate a failure of at least one of the impulse lines 21,21'. Otherwise, the diagnostic output provided by the output means 500 would indicate that there is no failure detected.

In an exemplary embodiment, the at least one correlation threshold value is derived from data obtained during a training phase, as will be discussed below.

Preferably, the means 100,200,400,500 are substantially realized in an adequately programmed microprocessor.

Figure 4:
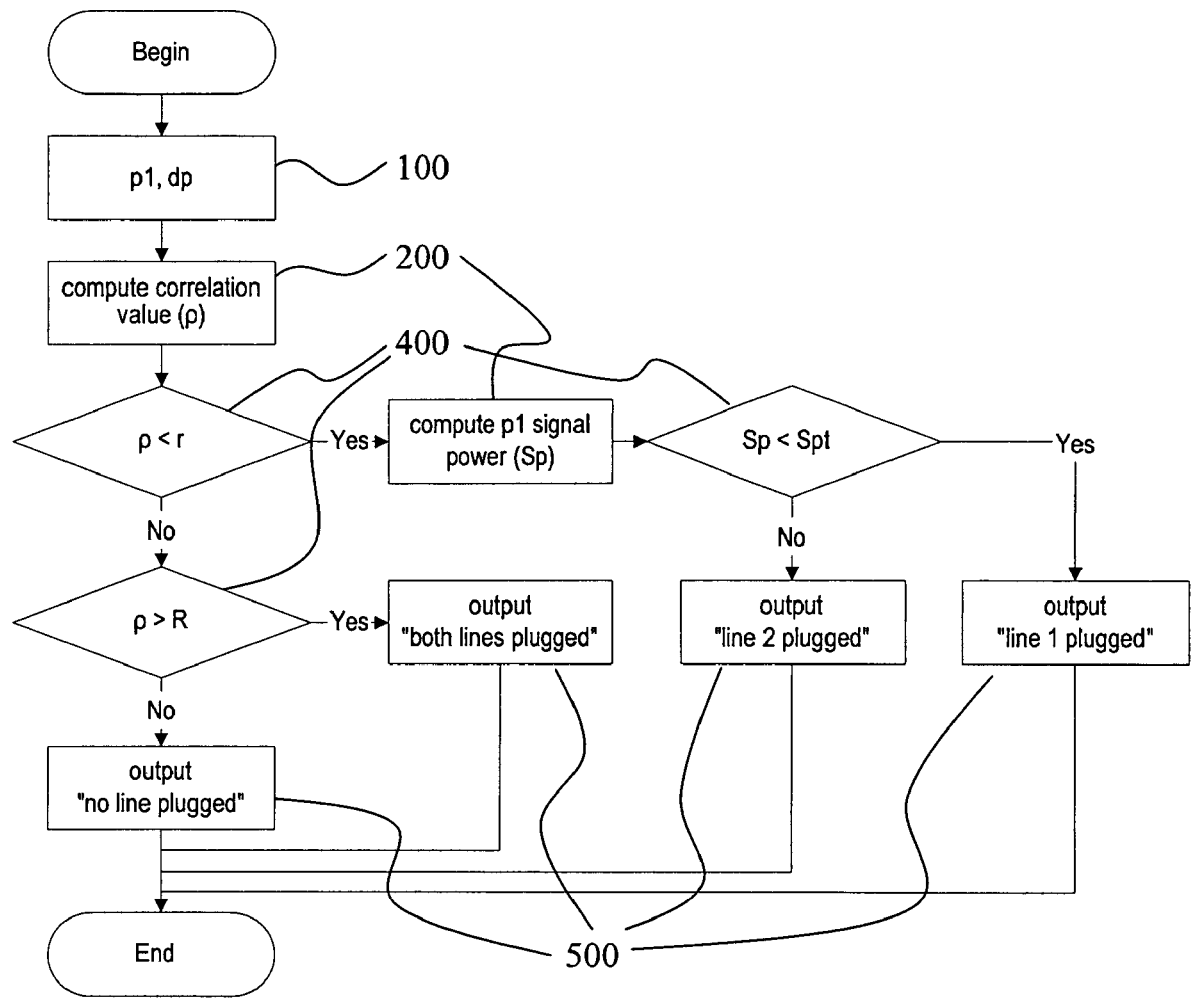
FIG. 4 a flow chart of a more elaborate diagnostic method.

In FIG. 4 a flow chart of a more elaborate diagnostic method is shown (steps performed in normal operation). It relates specifically to the detection of an impulse line failure due to plugging. After recording absolute pressure pairs p1,p2 and computing a correlation value ρ, that correlation value ρ is compared to a lower correlation threshold value r and to an upper correlation threshold value R, wherein the order of the two comparisons is not very important, but preferably, the second comparison is made only if the first comparison results in a "no".

If both comparisons (ρ<r and ρ>R) result in a "no", the diagnostic output will indicate that none of the impulse lines is plugged. If ρ>R, the diagnostic output will indicate that both impulse lines are plugged.

If ρ<r is the case, at least one impulse line is plugged (or has some failure). In that case, an analysis of one of the absolute pressure signals (here, e.g., p1) enables to give an indication, which one of the two impulse lines has a failure. Roughly speaking, if a significant decrease of the p1 signal has occurred, the impulse line associated with p1 is expected to be the plugged impulse line. Otherwise (i.e., no significant decrease of the p1 signal) the other impulse line is expected to be plugged.

In the computation means 200, a signal power value Sp of the p1 signal (e.g., the directly sensed absolute pressure) is computed. Sp is a value derived from coefficients of a transform of a series of p1 values. I.e., a prescribable number N of p1-values is transformed (e.g., Fourier or wavelet), so as to obtain a number of coefficients, and Sp is obtained as a function of these coefficients. Preferably, Sp is obtained as the sum of the absolute value of selected Fourier coefficients, e.g., as the intensity in a prescribable frequency range.

The Fourier coefficients X(k), with k being a frequency variable, and the Sp values can be calculated as follows:

$$X(k) = \sum_{t=0}^{N-1} x(t)e^{-j\frac{2\pi k}{N}t} \qquad (5)$$

$$P(k) = \begin{cases} 2|X(k)|^2 & 1 \le k \le \dfrac{N}{2}-1 \\ |X(k)|^2 & k=1, \dfrac{N}{2} \end{cases} \qquad (6)$$

$$Sp(k_1, k_2) = \sum_{k=k_1}^{k_2} P(k) \qquad (7)$$

Here, x(t) is the discrete time signal (absolute pressure value); Sp is the intensity within the frequency range ranging from $k_1$ to $k_2$; t is the time variable, e denotes the base of the natural logarithm, and j denotes the square root of −1. N is the number of absolute pressure values used for one transformation.

The obtained Sp value is then, in the comparison means 400, compared to at least one signal power threshold value Spt. Depending on the result of the comparison, the diagnostic output will indicate, which one of the impulse lines is plugged.

Thus, by analyzing not only the correlation of p1 and p2, but in addition also the signal power Sp of one absolute pressure value, it is possible not only to indicate that at least one impulse line is plugged, but also which one of the impulse lines is plugged, if only one is plugged.

The signal power threshold value Spt is prescribable. The at least one signal power threshold value can be derived from a number of signal power values obtained during a training phase, which training phase can be the same training phase as the one for obtaining the correlation threshold value(s).

Figure 5:
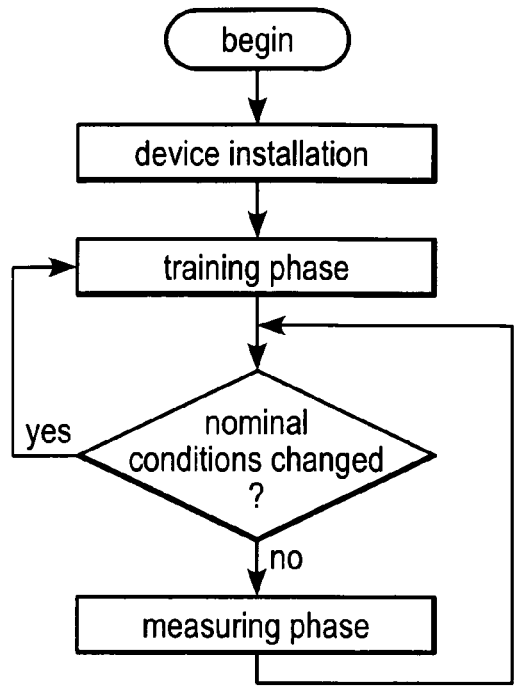
FIG. 5 a block diagram of a basic algorithm of a diagnostic device.

An exemplary basic algorithm for the functioning of a diagnostic device 10 according to the disclosure is sketched in the block diagram in FIG. 5. First, the diagnostic device installed, i.e., mainly the diagnostic device is coupled to the process. Then follows a training phase, during which threshold values are generated. If then the nominal conditions in the process are unchanged, a measuring phase (normal operation) can be entered. If, at any time, the nominal conditions in the process are changed, e.g., through installation of a new process device, another training phase should be absolved before entering measurement mode again.

Figure 6:
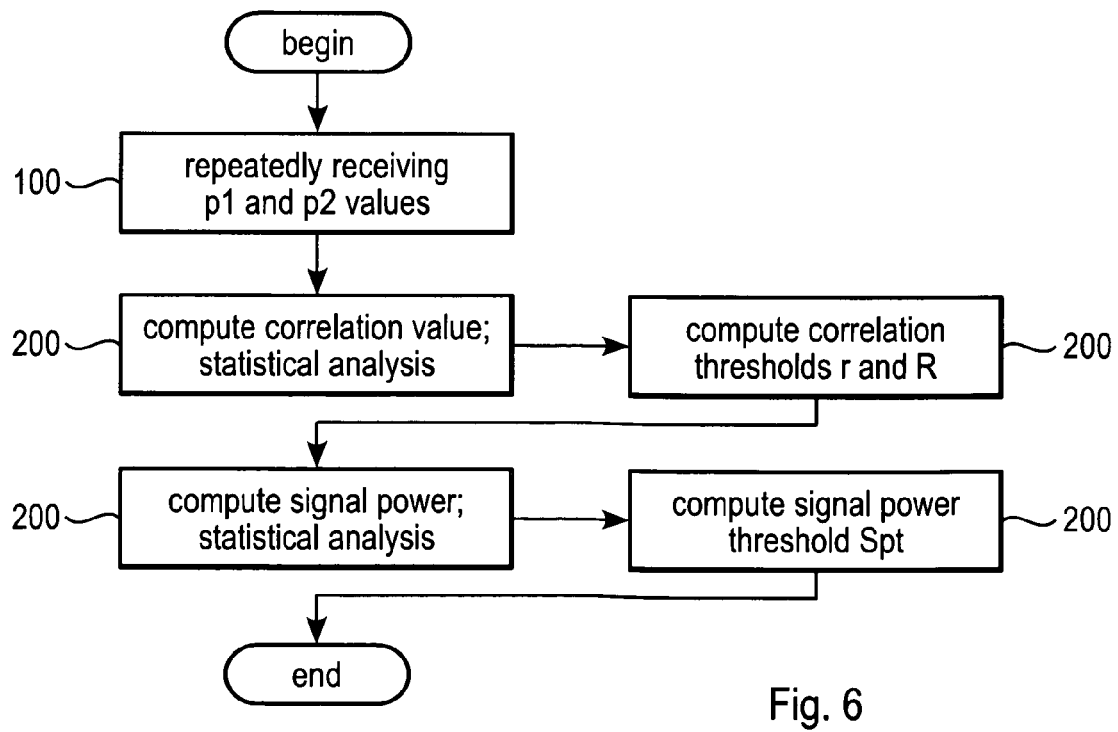
FIG. 6 a block diagram of steps performed during a training phase.

FIG. 6 sketches steps performed during a training phase. The training is aimed at recording typical values of the correlation coefficient and preferably also of the signal power values of the absolute pressure at nominal operating conditions of the process. For a predetermined span of time, p1 and p2 values are recorded (from absolute pressure measurements, or from an absolute pressure measurement and a differential pressure measurement). From various series of p1,p2 value pairs, one correlation value ρ is calculated each. These correlation values are then statistically analyzed, e.g., by calculating the (arithmetic) mean of the correlation values and possibly also the variance of the correlation values. The at least one correlation threshold value can then be calculated on the basis of the statistical analysis.

Preferably, this statistical analysis during the training phase comprises fitting a statistical distribution function to the distribution of correlation values obtained during the training phase. In case that the correlation values can have values only in the interval 0 to 1, the beta distribution could be applied. From the best-fitting (e.g., least-square-fit) distribution function, one or two correlation threshold values can be extracted. This has the advantage, that the at least one threshold value can be chosen with high precision on the basis of a relatively low number of correlation values determined during the training phase, and, in addition, the correlation threshold values will reflect the real process conditions very well. Furthermore, this allows to select the at least one threshold value such, that lower or higher correlation values occur with a prescribable probability.

In parallel to the correlation threshold value related matters (or before or after), the at least one signal power threshold value Spt is determined. In analogy to the correlation threshold value, a number of signal power values Sp are obtained during the training phase (details are given above), and a statistical analysis of these allows for a well-defined selection of Spt.

Another advantage of a statistical analysis of correlation values and/or signal powers obtained during the training with fitting of a statistical function is, that a diagnostic output can be provided with a "quality value", which indicates the degree of confidence of the output.

Through the flow of the process medium 2 (indicated by arrows in FIG. 1) and, in addition, through the process control devices 50,60, noise is generated in the process medium 2. Such noise can be sensed by means of the diagnostic device 10 in the transmitter 20. A change in the process conditions, e.g., a malfunction or failure of a process device 20,50,60, may be reflected in the sensed pressure signals. This can be used to detect failures of such process devices 20,50,60 by means of a diagnostic device and a diagnostic method as described above.

It will be appreciated by those skilled in the art that the present invention can be embodied in other specific forms without departing from the spirit or essential characteristics thereof. The presently disclosed embodiments are therefore considered in all respects to be illustrative and not restricted.

The scope of the invention is indicated by the appended claims rather than the foregoing description and all changes that come within the meaning and range and equivalence thereof are intended to be embraced therein.

List of Reference Symbols

| | |
|---|---|
| 1 | process control environment |
| 2 | process medium, process fluid |
| 3 | tube |
| 5 | process control system, process control device |
| 10 | diagnostic device |
| 15 | microprocessor |
| 20 | transmitter, pressure transmitter, differential and absolute pressure transmitter, |
| 21 | (first) impulse line |
| 21 | (second) impulse line |
| 22 | process membrane |
| 23 | pressure transmission arm, oil circuit |
| 24 | sensing medium, oil |
| 25 | sensing means |
| 26 | sensing element, sensing system |
| 27 | A/D converter |
| 50 | pump |
| 51 | pump control |
| 60 | valve |
| 61 | valve control |
| 100 | recording means |
| 200 | computation means |
| 400 | comparison means |
| 500 | output means |
| k | transform variable, frequency |
| $k_1, k_2$ | limit values in transform space, frequency limits |
| dp | differential pressure value ($p^+ - p^-$) |
| p1 | (first) absolute pressure value |
| p2 | (second) absolute pressure value |
| $p^+$ | absolute pressure value (measured upstream) |
| p | absolute pressure value (measured downstream) |
| r | correlation threshold value, lower correlation threshold value |
| R | correlation threshold value, upper correlation threshold value |
| Sp | signal power value |
| Spt | signal power threshold value |
| t | time |
| X(k) | transform, discrete transform, discrete Fourier transform, coefficient |
| x(t) | process variable value (taken at various times), pressure value |
| ρ | correlation value |

What is claimed is:

1. A diagnostic device that detects a failure of a sensing means, the sensing means comprises a first impulse line and a second impulse line, wherein the diagnostic device comprises:

a recording means for repeatedly recording pairs of two absolute pressure values, the absolute pressure values being related to absolute pressures in the first impulse line and the second impulse line, respectively, a computation means for repeatedly computing, from a prescribable number of pairs of the two absolute pressure values, a correlation value representative of the correlation between the two absolute pressure values, a comparison means for comparing correlation values to at least one correlation threshold value, and an output means for outputting a diagnostic output depending on the result of the comparison, wherein the correlation values are compared to a lower correlation threshold value and to an upper correlation threshold value.

2. The diagnostic device according to claim 1, wherein the at least one correlation threshold value is derived from a statistical analysis of a number of correlation values obtained during a training phase.

3. The diagnostic device according to claim 2, wherein the statistical analysis comprises fitting a statistical distribution function to the correlation values recorded during the training phase.

4. The diagnostic device according to claim 3, wherein the computation means is designed for repeatedly computing, from a prescribable number of a first of the two absolute pressure values, a signal power value, and the comparison means is designed for comparing signal power values to at least one signal power threshold value, wherein signal power values are derived from a transform of the prescribable number of first pressure values into coefficients of a set of orthogonal functions.

5. The diagnostic device according to claim 1, wherein the computation means is designed for repeatedly computing, from a prescribable number of a first of the two absolute pressure values, a signal power value, and the comparison means is designed for comparing signal power values to at least one signal power threshold value, wherein signal power values are derived from a transform of the prescribable number of first pressure values into coefficients of a set of orthogonal functions.

6. The diagnostic device according to claim 5, wherein the transform is one of the group of Fourier transform and wavelet transform.

7. The diagnostic device according to claim 6, wherein the least one signal power threshold value is obtained from a number of signal power values obtained during a training phase.

8. The diagnostic device according to claim 5, wherein the least one signal power threshold value is obtained from a number of signal power values obtained during a training phase.

9. The diagnostic device according to claim 8, wherein the diagnostic device comprises at least one of the sensing means for measurement of an absolute pressure, and
for measurement of a differential pressure between the two impulse lines,
and wherein the two absolute pressure values are derived from measurements performed with the at least one sensing means.

10. The diagnostic device according to claim 1, wherein the diagnostic device comprises at least one of the sensing means for measurement of an absolute pressure, and
for measurement of a differential pressure between the two impulse lines,
and wherein the two absolute pressure values are derived from measurements performed with the at least one sensing means.

11. A process control environment comprising a diagnostic device according to claim 10.

12. A process control environment comprising a diagnostic device according to claim 1.

13. A method for detecting a failure of a sensing means in a process control environment, the sensing means having a first impulse line and a second impulse line, the method comprising the steps of:
recording pairs of two absolute pressure values, the absolute pressure values being related to the absolute pressures in the first impulse line and the second impulse line,
computing, using a processor, from a prescribable number of pairs of the two absolute pressure values, a correlation value representative of the correlation between the two absolute pressure values,
comparing correlation values to a lower correlation threshold value and to an upper correlation threshold value, and
outputting a diagnostic output depending on the result of the comparison.

14. Process control environment comprising a diagnostic device for implementing a diagnostic method according to claim 13.

* * * * *